United States Patent
Sakurai et al.

(10) Patent No.: US 12,305,585 B2
(45) Date of Patent: May 20, 2025

(54) STARTUP CONTROL METHOD FOR IN-CYLINDER DIRECT INJECTION SPARK IGNITION INTERNAL COMBUSTION ENGINE, AND INTERNAL COMBUSTION ENGINE SYSTEM

(71) Applicant: NISSAN MOTOR CO., LTD., Yokohama (JP)

(72) Inventors: Yuusuke Sakurai, Kanagawa (JP); Kazuki Tanzawa, Kanagawa (JP); Yoshikatsu Matsuda, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/742,309

(22) Filed: Jun. 13, 2024

(65) Prior Publication Data
US 2024/0426254 A1 Dec. 26, 2024

(30) Foreign Application Priority Data
Jun. 22, 2023 (JP) .................. 2023-102153

(51) Int. Cl.
| | |
|---|---|
| *F02D 41/06* | (2006.01) |
| *F01N 3/20* | (2006.01) |
| *F02D 41/00* | (2006.01) |
| *F02D 41/02* | (2006.01) |
| *F02D 41/38* | (2006.01) |
| *F02D 41/40* | (2006.01) |
| *F02P 5/15* | (2006.01) |

(Continued)

(52) U.S. Cl.
CPC ......... *F02D 41/064* (2013.01); *F01N 3/2006* (2013.01); *F02D 41/0002* (2013.01); *F02D 41/024* (2013.01); *F02D 41/0245* (2013.01); *F02D 41/3836* (2013.01); *F02D 41/40* (2013.01); *F02P 5/1506* (2013.01); *F01N 3/101* (2013.01); *F01N 11/002* (2013.01); *F01N 2430/08* (2013.01); *F01N 2900/1602* (2013.01); *F02D 2041/0015* (2013.01); *F02D 2041/389* (2013.01)

(58) Field of Classification Search
CPC ...... F01N 3/101; F01N 3/2006; F01N 11/002; F01N 2430/08; F01N 2900/1602; F02D 41/0002; F02D 2041/0015; F02D 41/0245; F02D 41/064; F02D 41/3836; F02D 2041/389; F02D 41/40; F02P 5/1506
USPC .................. 60/284, 285, 300, 320
See application file for complete search history.

(56) References Cited

FOREIGN PATENT DOCUMENTS

JP 2009-002176 A 1/2009

*Primary Examiner* — Jorge L Leon, Jr.
(74) *Attorney, Agent, or Firm* — Foley & Lardner LLP

(57) ABSTRACT

For an in-cylinder direct injection spark ignition internal combustion engine including an intake port provided with a tumble control valve, a startup control method is presented. When a startup of the engine satisfies a predetermined cold start condition requiring a retard operation of the engine for catalyst warmup, a startup process is performed. The startup process includes: closing the tumble control valve; after the closing of the tumble control valve, starting to crank the engine; implementing fuel injection of the engine by a single-injection operation during a time period from an initial cycle of combustion of the engine to an event that the engine rises and reaches a predetermined rotation speed; after the event, shifting from the single-injection operation to a multiple-injection operation; and substantially simultaneously with the shifting to the multiple-injection operation, starting an ignition timing retard.

7 Claims, 2 Drawing Sheets

(51) Int. Cl.
*F01N 3/10* (2006.01)
*F01N 11/00* (2006.01)

- VEHICLE SPEED

- ENGINE SPEED

- AMOUNT OF RETARD

- NUMBER OF TIMES OF INJECTION

- TUMBLE CONTROL VALVE

- FUEL PRESSURE

STARTUP CONTROL METHOD FOR IN-CYLINDER DIRECT INJECTION SPARK IGNITION INTERNAL COMBUSTION ENGINE, AND INTERNAL COMBUSTION ENGINE SYSTEM

BACKGROUND

The present invention relates generally to an internal combustion engine, and particularly to a startup control method for an in-cylinder direct injection spark ignition internal combustion engine, and an internal combustion engine system, in which a retard operation including an ignition timing retard is performed for catalyst warmup during a cold start.

Japanese Patent Application Publication No. 2009-002176 (JP 2009-002176 A) discloses a control process for an internal combustion engine that is an in-cylinder direct injection spark ignition internal combustion engine including an intake port provided with a tumble control valve. The control process includes: during a cold start, injecting fuel in multiple timings during an intake stroke, and raising fuel pressure, for suppressing adhesion of injected fuel to a cylinder wall and dilution of oil, and further closing the tumble control valve, for enhancing an in-cylinder tumble flow.

SUMMARY

The control process disclosed by JP 2009-002176 A merely relates to suppression of adhesion of injected fuel to a cylinder wall during a cold start. JP 2009-002176 A does not address a retard operation immediately after a cold start.

In view of the foregoing, it is desirable to provide a startup control method for an in-cylinder direct injection spark ignition internal combustion engine, and an internal combustion engine, by which an ignition timing retard for catalyst warmup is maximized to achieve a quick temperature rise of a catalyst in a catalytic converter without adversely affecting engine startability.

According to one or more embodiments, a startup control method for an internal combustion engine, wherein the internal combustion engine is an in-cylinder direct injection spark ignition internal combustion engine including an intake port provided with a tumble control valve, the startup control method includes: implementing a startup of the internal combustion engine by: determining whether or not the startup of the internal combustion engine satisfies a predetermined cold start condition requiring a retard operation of the internal combustion engine for catalyst warmup; and when determining that the startup of the internal combustion engine satisfies the predetermined cold start condition, performing a startup process; wherein the startup process includes: closing the tumble control valve; after the closing of the tumble control valve, starting to crank the internal combustion engine; implementing fuel injection of the internal combustion engine by a single-injection operation during a time period from an initial cycle of combustion of the internal combustion engine to an event that the internal combustion engine rises and reaches a predetermined rotation speed; after the event, shifting from the single-injection operation to a multiple-injection operation; and substantially simultaneously with the shifting to the multiple-injection operation, starting an ignition timing retard.

DETAILED DESCRIPTION

Figure 1:
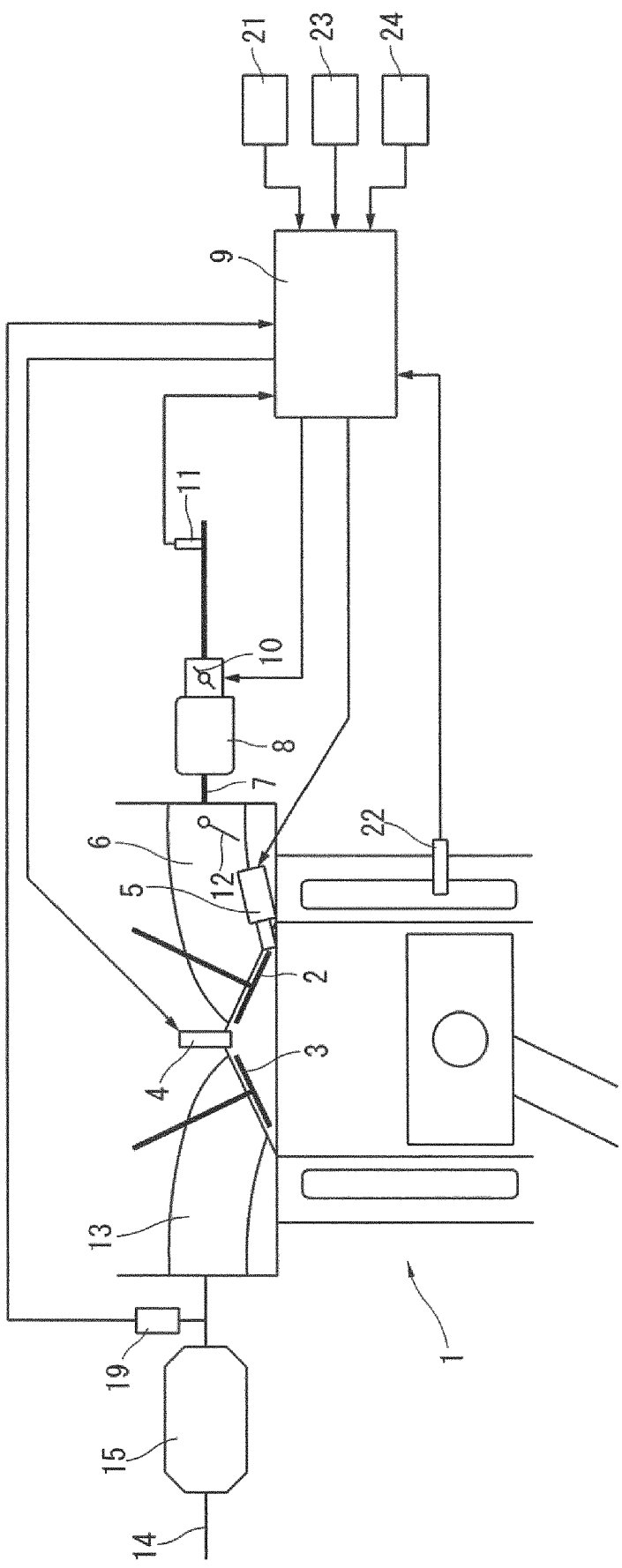
FIG. 1 is a schematic diagram showing an internal combustion engine system according to an embodiment of the present invention.

FIG. 1 schematically shows an internal combustion engine system according to an embodiment of the present invention. The internal combustion engine system includes an internal combustion engine 1. The internal combustion engine 1 is a four stroke cycle spark ignition internal combustion engine (gasoline engine). Each cylinder of the internal combustion engine 1 is provided with an intake valve 2, an exhaust valve 3, and an ignition plug 4. The internal combustion engine 1 is also an in-cylinder direct injection internal combustion engine in which each cylinder is provided with a fuel injection valve 5 arranged in a suitable position for injecting fuel into the cylinder. The fuel injection valve 5 is supplied with fuel having a fuel pressure regulated by a pressure regulator not shown. The fuel injection valve 5 is structured to open in response to a drive pulse signal transmitted from an engine controller 9, and thereby inject a regulated quantity of fuel corresponding to the width of the drive pulse signal.

Each cylinder has an intake port 6 connected to an intake passage 7. The intake passage 7 includes a collector section 8, and a section upstream of the collector section 8 where a throttle valve 10 is disposed. The throttle valve 10 has an opening that is electronically controlled by a control signal from the engine controller 9. The intake passage 7 further includes a section upstream of the throttle valve 10 where an airflow meter 11 is disposed. Upstream of the airflow meter 11, an air cleaner not shown is disposed.

The intake port 6 of each cylinder is provided with a tumble control valve 12 structured to cover a lower half of a cross-sectional area of flow path in this example. The tumble control valve 12 is configured to rotate around a rotation axis that extends laterally through a center of the cross-sectional area of flow path. The opening of the tumble control valve 12 is controlled by a control signal from the engine controller 9. When the tumble control valve 12 is closed, intake air flowing into the cylinder via the intake valve 2 flows fast only through one side with respect to the rotation axis of the tumble control valve 12, causing an intense tumble flow in the cylinder. In this example, the tumble control valve 12 is a normally closed valve. When an actuator of the tumble control valve 12 is de-energized by the engine controller 9, the tumble control valve 12 is in a closed position as shown in FIG. 1.

Each cylinder has an exhaust port 13 that is collected as a single exhaust passage 14. The exhaust passage 14 is provided with a three-way catalytic converter 15 for exhaust gas purification. In this example, the three-way catalytic converter 15 contains a monolith ceramic catalyst that is produced by coating a monolith ceramic body with a catalyst layer on the surface of the monolith ceramic body, wherein the monolith ceramic body is formed with fine paths, wherein the catalyst layer contains a piece of catalyst metal. The three-way catalytic converter 15 may be configured as a combination of a plurality of catalytic converters connected in series (for example, a manifold catalytic converter and an underfloor catalytic converter).

An air fuel ratio sensor 19 is disposed in a section of the exhaust passage 14 on an inlet side of the three-way catalytic converter 15, namely, upstream of the three-way catalytic converter 15, for sensing an exhaust air fuel ratio.

The air fuel ratio sensor 19 and the airflow meter 11 generate sensing signals which are inputted to the engine controller 9. The engine controller 9 is further configured to receive input of sensing signals from other sensors. The sensors include: a crank angle sensor 21 for sensing the rotation speed of the engine; a water temperature sensor 22 for sensing the temperature of coolant water; an outside air temperature sensor 23 for sensing the temperature of outside air; and an accelerator opening sensor 24 for sensing an amount of depression of an accelerator pedal that is operated by a driver. Based on these input sensing signals, the engine controller 9 optimally controls the fuel injection quantity and fuel injection timing of the fuel injection valve 5, the ignition timing of the ignition plug 4, the opening of the throttle valve 10, the opening of the tumble control valve 12, etc.

The engine controller 9 is further configured to perform a retard operation including an in ignition timing retard for catalyst warmup at a cold start. Specifically, when a main switch (ignition switch) of the vehicle is turned on, the engine controller 9 determines whether nor not a startup of the engine to be performed satisfies a predetermined cold start condition requiring the retard operation for catalyst warmup. When determining that the startup of the engine satisfies the predetermined cold start condition, the engine controller 9 performs a control process in accordance with a predetermined sequence as shown in the time charts of FIG. 2A to 2F, shifting from cranking to the retard operation.

FIGS. 2A to 2F are time charts showing the vehicle speed, the engine rotation speed, the amount of ignition timing retard, the number of times of injection, the open/closed state of the tumble control valve 12, and the fuel pressure, respectively.

Figure 2A:
FIGS. 2A to 2F are a set of time charts showing behavior of a tumble control valve, etc., during a cold start of an internal combustion engine.
Figure 2B:
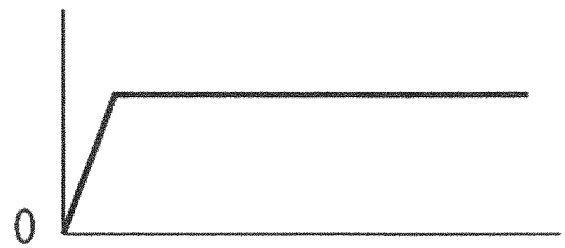
Figure 2C:
Figure 2D:
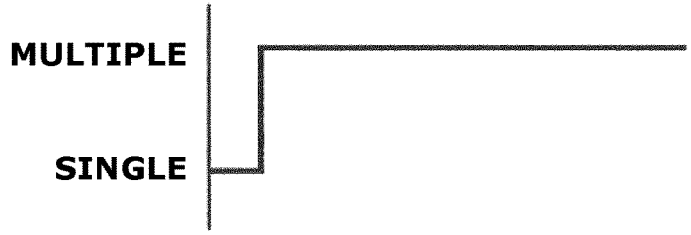
Figure 2E:
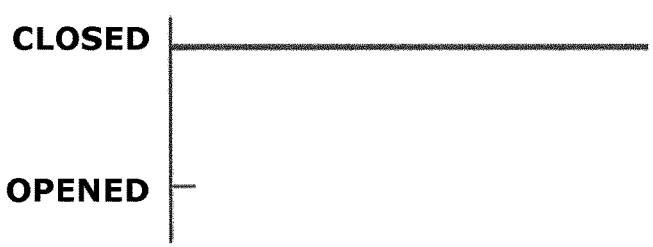
Figure 2F:
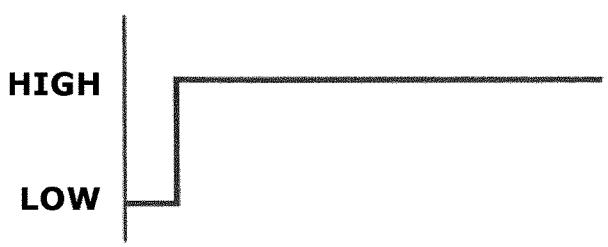

When it is a cold start requiring the retard operation, the tumble control valve 12 is controlled into the closed position before cranking of the engine starts, as shown in FIG. 2E. Under this condition, cranking of the engine is started by a starter motor not shown. As shown in FIG. 2D, the fuel injection is implemented by a single-injection operation during an intake stroke, during a time period from an initial cycle of combustion to an event that the engine rotation speed rises and reaches a predetermined rotation speed. At an initial stage of the startup, the ignition timing is controlled to a normal setpoint for a condition where no intentional retard is made for raising the exhaust gas temperature. The control where the single-injection operation is adopted and no ignition timing retard is performed, serves to ensure a reliable process of ignition and combustion during a cold start. Namely, there is no possibility to cause adverse effects in startup by cranking. During the single-injection operation, the fuel pressure is controlled at a relatively low setpoint, as shown in FIG. 2F.

As shown in FIG. 2B, after a condition of complete combustion cycle is established after the cranking, the engine rotation speed rises to a predetermined idle rotation speed. Specifically, the engine speed rises and overshoots the predetermined idle rotation speed, and thereafter falls to the predetermined idle rotation speed, and is thereafter maintained at the predetermined idle rotation speed by a so-called idle rotation speed keeping control. During the retard operation, the idle rotation speed is set higher than after the warming up is completed.

When the engine rotation speed rises and reaches the predetermined idle rotation speed, the fuel injection mode is shifted from the single-injection operation to the multiple-injection operation. In this example, the multiple-injection operation is implemented by a two-stage injection operation including a first injection during the intake stroke and a second injection during an initial stage of the compression stroke. Alternatively, the multiple-injection operation may be implemented by a two-stage injection operation including first and second injections during the intake stroke. In this example, the multiple-injection operation is not intended to produce stratified combustion, but basically intended to produce homogeneous combustion. Along with the shift to the multiple-injection operation, the fuel pressure is controlled to be relatively high, as shown in FIG. 2F. The multiple-injection operation serves to enhance atomization of the fuel and thereby enhance vaporization of the fuel during cold start.

Substantially simultaneously with the shift to the multiple-injection operation, the ignition timing retard is started in order to raise the exhaust gas temperature. Specifically, the shift to the multiple-injection operation is performed before the start of the ignition timing retard, so as not to cause a combustion cycle in which the ignition timing retard is performed along with the single-injection operation. As shown in FIG. 2C, the ignition timing retard is performed so as to cause the ignition timing to change gradually to a target point, while preventing the ignition timing from changing to the target point in a stepwise manner. This serves to enhance the basic stability of combustion, because the closing of the tumble control valve 12 serves to enhance the gas flow motion in the cylinder and enhance the tumble flow in the cylinder, and the two-stage injection operation based on the relatively high fuel pressure serves to enhance atomization of the fuel and thereby enhance vaporization of the fuel. As compared to a case where the single-injection operation is employed without intensifying the tumble flow, it is possible to expand the limitation of the amount of retard of the ignition timing to the retard side, and it is possible to retard the ignition timing more significantly. The feature that the tumble control valve 12 is closed before the start of cranking and is thereafter maintained, serves to enhance the in-cylinder gas motion reliably when the ignition timing retard is started, wherein there is no influence of delay of movement of intake air. Therefore, it is possible to prevent instability of combustion during a combustion cycle immediately after the start of the ignition timing retard.

The achieved significant amount of retard of the ignition timing causes the exhaust gas temperature to be high, and thereby promotes warmup of the three-way catalytic converter 15. When it is determined that the temperature of the three-way catalytic converter 15 has reached a sufficient level, the retard operation is terminated. Until the retard operation is terminated, the tumble control valve 12 is held closed.

The embodiment described above may be modified variously. For example, although the embodiment is configured such that the shift to the multiple-injection operation and the start of the ignition timing retard are performed when the condition of complete combustion cycle is established and thereafter the idle rotation speed is reached, the embodiment may be modified such that the shift to the multiple-injection operation and the start of the ignition timing retard are performed when the condition of complete combustion cycle is established and thereafter a predetermined period of time (or a predetermined number of combustion cycles) has elapsed.

The entire contents of Japanese Patent Application 2023-102153 filed Jun. 22, 2023 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A startup control method for an internal combustion engine, wherein the internal combustion engine is an in-cylinder direct injection spark ignition internal combustion engine including an intake port provided with a tumble control valve, the startup control method comprising:
   implementing a startup of the internal combustion engine by:
      determining whether or not the startup of the internal combustion engine satisfies a predetermined cold start condition requiring a retard operation of the internal combustion engine for catalyst warmup; and
      when determining that the startup of the internal combustion engine satisfies the predetermined cold start condition, performing a startup process;
   wherein the startup process includes:
      closing the tumble control valve;
      after the closing of the tumble control valve, starting to crank the internal combustion engine;
      implementing fuel injection of the internal combustion engine by a single-injection operation during a time period from an initial cycle of combustion of the internal combustion engine to an event that the internal combustion engine rises and reaches a predetermined rotation speed;
      after the event, shifting from the single-injection operation to a multiple-injection operation; and
      substantially simultaneously with the shifting to the multiple-injection operation, starting an ignition timing retard.

2. The startup control method as claimed in claim 1, wherein the startup process includes:
   holding the tumble control valve closed until termination of the retard operation.

3. The startup control method as claimed in claim 1, wherein the startup process includes:
   implementing the multiple-injection operation by a two-stage injection operation, wherein the two-stage injection operation includes a first injection during an intake stroke of the internal combustion engine, and a second injection during an initial stage of a compression stroke of the internal combustion engine.

4. The startup control method as claimed in claim 1, wherein the startup process includes:
   implementing the shifting to the multiple-injection operation and the starting of the ignition timing retard by starting the multiple-injection operation and the ignition timing retard after the internal combustion engine rises and reaches a preset idle rotation speed.

5. The startup control method as claimed in claim 1, wherein the startup process includes:
   controlling fuel pressure of the internal combustion engine such that the fuel pressure is lower during the single-injection operation than during the multiple-injection operation.

6. The startup control method as claimed in claim 1, further comprising:
   employing a normally closed tumble control valve as the tumble control valve.

7. An internal combustion engine system comprising:
   an internal combustion engine that is an in-cylinder direct injection spark ignition internal combustion engine including an intake port provided with a tumble control valve; and
   a controller configured to implement a startup of the internal combustion engine by:
      determining whether or not the startup of the internal combustion engine satisfies a predetermined cold start condition requiring a retard operation of the internal combustion engine for catalyst warmup; and
      when determining that the startup of the internal combustion engine satisfies the predetermined cold start condition, performing a startup process;
   wherein the startup process includes:
      closing the tumble control valve;
      after the closing of the tumble control valve, starting to crank the internal combustion engine;
      implementing fuel injection of the internal combustion engine by a single-injection operation during a time period from an initial cycle of combustion of the internal combustion engine to an event that the internal combustion engine rises and reaches a predetermined rotation speed;
      after the event, shifting from the single-injection operation to a multiple-injection operation; and
      substantially simultaneously with the shifting to the multiple-injection operation, starting an ignition timing retard.

* * * * *